United States Patent [19]

Barzilai et al.

[11] Patent Number: 5,270,520

[45] Date of Patent: Dec. 14, 1993

[54] HAIR STYLING APPLIANCES AND HEATER CONTROL CIRCUITS THEREFOR

[75] Inventors: Yinon Barzilai; Ronald L. Lerner; James G. Montagnino; Yigal Offir, all of El Paso, Tex.

[73] Assignee: Helen of Troy Corporation, El Paso, Tex.

[21] Appl. No.: 764,328

[22] Filed: Sep. 23, 1991

[51] Int. Cl.⁵ .............................................. H05B 1/00
[52] U.S. Cl. ..................... 219/501; 219/223; 219/225; 219/240; 219/544; 219/551; 219/497; 219/505
[58] Field of Search ............... 219/492, 497, 494, 501, 219/508, 505, 504, 222, 223, 225, 240, 538, 544, 551

[56] References Cited

U.S. PATENT DOCUMENTS

| | | | |
|---|---|---|---|
| 2,341,013 | 2/1944 | Black | 178/44 |
| 2,465,352 | 3/1949 | Chatterhea et al. | 219/501 |
| 3,136,877 | 6/1964 | Heller | 219/225 |
| 3,456,095 | 7/1969 | Fox | 219/497 |
| 3,551,639 | 12/1970 | Gotley | 219/491 |
| 3,644,864 | 2/1972 | Hirsbrunner et al. | 338/25 |
| 3,744,921 | 7/1973 | Weller et al. | 219/501 |
| 3,863,210 | 1/1975 | Roland et al. | 340/59 |
| 3,925,139 | 12/1975 | Simmons | 219/243 |
| 4,039,996 | 8/1977 | Handerhan | 338/295 |
| 4,121,092 | 10/1978 | Undin | 219/501 |
| 4,354,093 | 10/1982 | Zago | 219/225 |
| 4,381,009 | 4/1983 | Del Bon | 219/241 |
| 4,493,972 | 1/1985 | Steinel et al. | 219/230 |
| 4,549,074 | 10/1985 | Matsuo | 219/505 |
| 4,602,143 | 7/1986 | Mack et al. | 219/373 |
| 4,673,798 | 6/1987 | Contri et al. | 219/225 |
| 4,736,090 | 4/1988 | De Broeck et al. | 219/497 |

Primary Examiner—Mark H. Paschall
Attorney, Agent, or Firm—Watson, Cole, Grindle & Watson

[57] ABSTRACT

The invention is directed to a hair styling appliance having heat conductive portion for applying heat to the hair and an electrically energizable heater element located in thermal relationship with the heat conductive portion for causing it to be heated upon application of energy. A temperature sensor is located in thermal relationship with the heat conductive portion. The temperature sensor is electrically connected to the heater element and has a positive temperature coefficient of resistance. A pulse switching device is operatively coupled to the heater and responsively coupled to the temperature sensor for controlling energization of the heater with temperature. A selectable temperature setting circuit is coupled to the pulse switching device for varying energization of the heater in accordance with a selected temperature operation. In a particular embodiment, the temperature sensor has a characteristic in the form of a curve with a rate of resistance which gradually changes over the desired temperature range resulting in stable temperature control and fast recovery from thermal loads.

22 Claims, 8 Drawing Sheets

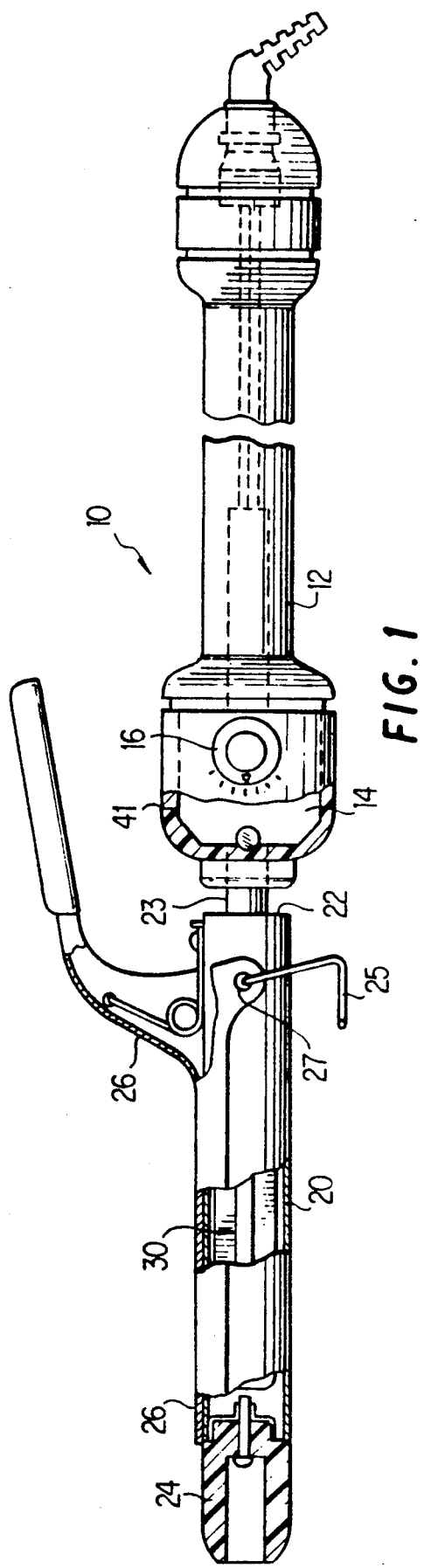
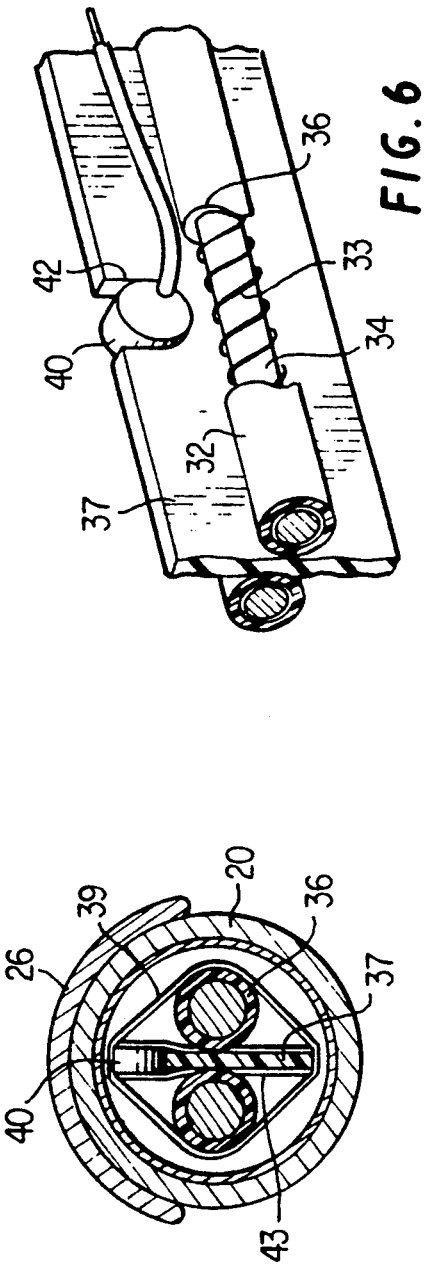

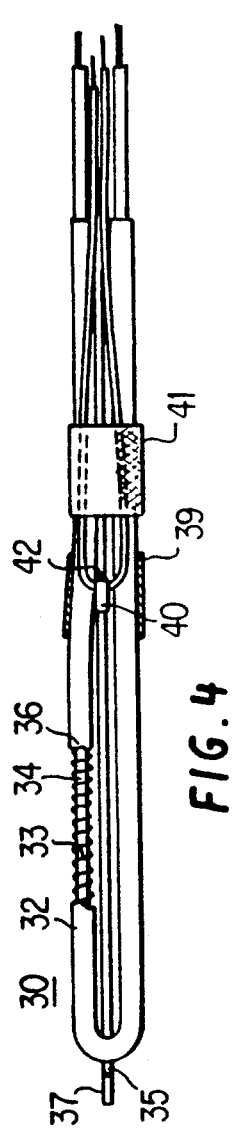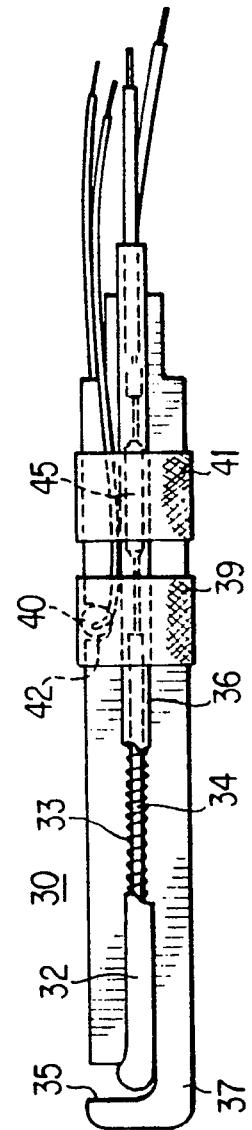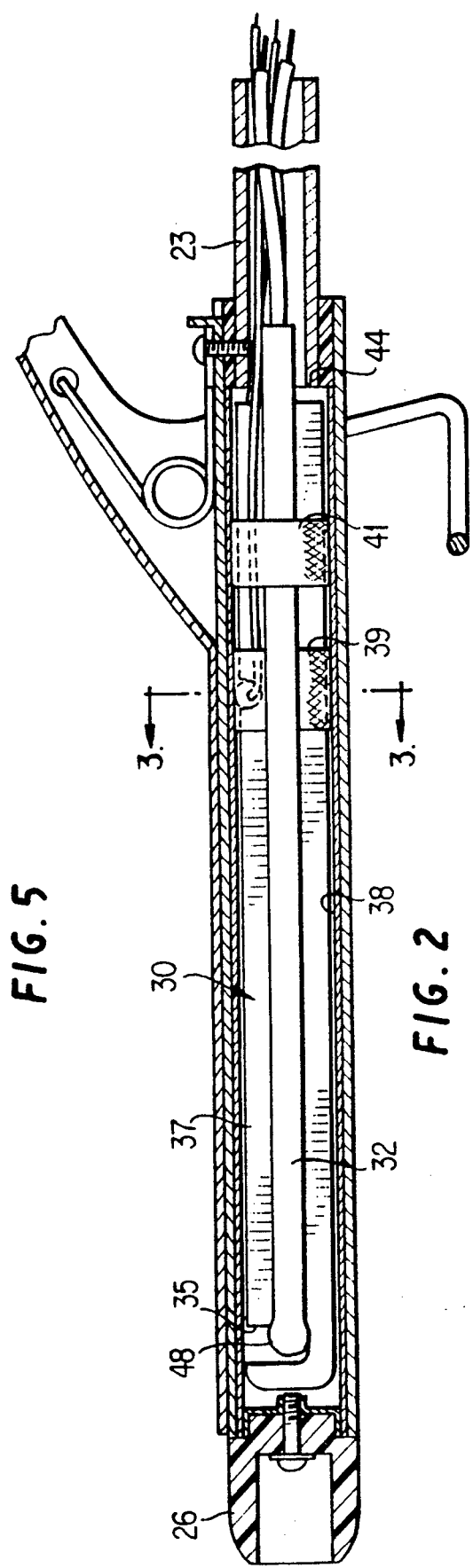

HAIR STYLING APPLIANCES AND HEATER CONTROL CIRCUITS THEREFOR

BACKGROUND OF THE INVENTION

The invention relates to heated hair styling appliances. In particular, the invention pertains to hair styling appliances having heaters and control circuits therefor in which stable, safe and effective operating temperatures may be maintained for relatively long periods under variable heavy load conditions and which have relatively fast recovery times. The hair styling appliances to which the invention is applicable includes curling irons which are discussed in detail as well as hair straighteners, hair crimpers and hot combs.

Human hair has a number of properties which affect its susceptibility to taking a curl. These properties include hair thickness, texture and color. For example, thick dark hair is more difficult to curl than light thin or fine hair. So called ethnic hair, as it is generally known in the art, is particularly difficult to curl. It is generally thick and may already hold a natural curl which must first be relieved. In preparation for curling, the hair is wet and is treated with a styling aid to effect a desired precurling condition. Such pretreated hair may require the application of a relatively high heat for about 30 seconds in order to result in the desired curl. This represents a relatively high thermal load on the heater.

Although an effective curling temperature range is about 140°-160° C., known curling irons suitable for treating ethnic hair are generally over powered. These irons operate in a temperature range having a high temperature in excess of 300° C. Such a high temperature is thought to be necessary in order to compensate for the high thermal load. However, even when operated at such a high temperature, only about three curls may be formed before the curling iron cools below the effective curling temperature, after which the iron must be allowed to recover. The recovery time may be as much as 10 minutes to reach the peak operating temperature whereupon curling may be resumed.

At the high temperature, extreme care must be exercised in order to prevent damaging the hair. When, as desired, lower temperatures are used, the irons have a shorter operating time and thus must be allowed to recover more frequently. Accordingly, it is not unusual for an operator to alternately employ more than one iron at a time.

Some curling irons are equipped with devices for limiting the maximum temperature in order to prevent damage of the hair or damage to the curling iron itself. Such devices suffer from inefficient operating cycles. Some known devices include a thermostat for controlling temperature. Thermostats are effective but are slow to react and cause irregular recovery or hysterises so that low temperature recovery is not effective. When the set point of the thermostat is reached, the device reacts with a change in voltage which is at the high point allowed. At this point, however, the temperature will overshoot. The opposite is also true that when the temperature falls, it drops below the desired point. Thus, because of its nature, when the thermostat reacts it allows a much higher or lower temperature level than desired.

Some systems use a positive temperature coefficient (PTC) device such as a thermistor having a resistance characteristic which changes with temperature to control high temperature cutoff. In a conventional PTC device, at some temperature known as the point of inflection, the resistance characteristic suddenly changes and becomes extremely steep. This effectively cuts input power into the heater. However, the response of the PTC may be greatly affected by the input power. As a result, conventional PTCs are difficult to control and are somewhat unstable because the resistance change is virtually unregulated. Such instability results in control problems and unsatisfactory results.

Overall, conventional circuits employing PTCs are often undesirably complex and expensive to manufacture. They require more components. Certain components are individually complex, e.g. IC chips. Some require high power and complex control circuits, e.g. SCRs. Accordingly, conventional circuits are more difficult to design and manufacture, and are not cost effective in many applications.

In addition to the hair styling applications herein described, for example, other applications in the consumer market which use heaters, such as, personal care items, food preparation appliances and tools may benefit from more cost effective, reliable, and safe heater controls with fast recovery times.

SUMMARY OF THE INVENTION

In an exemplary embodiment, the present invention is directed to hair styling appliances and heater controls therefor which are designed to obviate the shortcomings and limitations of the described prior arrangements. In particular, the invention comprises a hair curling iron having a heat conductive hollow barrel portion for applying heat to the hair; an electrically energizable heater element having a power circuit and being located within the barrel in thermal relationship with it for causing the barrel to be heated upon application of energy; and a control circuit for the heater element. The control circuit includes temperature sensor, which has a positive temperature coefficient of resistance, located in thermal relationship with the barrel and electrically connected in the power circuit of the heater element. A pulse switching means is operatively coupled to the heater in the power circuit and is responsively coupled to the temperature sensor in the control circuit for controlling energization of the heater with temperature. A temperature selection circuit is coupled to the pulse switching means for varying energization of the heater in accordance with a selected temperature operation. In a preferred embodiment, the temperature sensor has a resistance characteristic which gradually changes by no more than about 240k ohms in a temperature range between 100° C. and 165° C. to regulate the temperature. Other embodiments include temperature controls for a variety of applications including various personal care items, food preparation appliances and tools requiring safe, stable and cost effective heater controls with fast recovery times.

BRIEF DESCRIPTION OF THE DRAWINGS

FIG. 1 is a side elevation with portions shown in section lines of an exemplary curling iron in accordance with the present invention;

FIG. 2 is a fragmentary side sectional view of the barrel portion of the curling iron of FIG. 1;

FIG. 3 is a sectional view of the heater element and barrel portion taken along lines 3—3 of FIG. 2;

FIG. 4 is a fragmentary top plan view of the heater;

FIG. 5 is a side view of the heater;

FIG. 6 is a fragmentary perspective view of a portion of the heater shown in FIGS. 4 and 5;

DESCRIPTION OF THE INVENTION

Figure 6A:
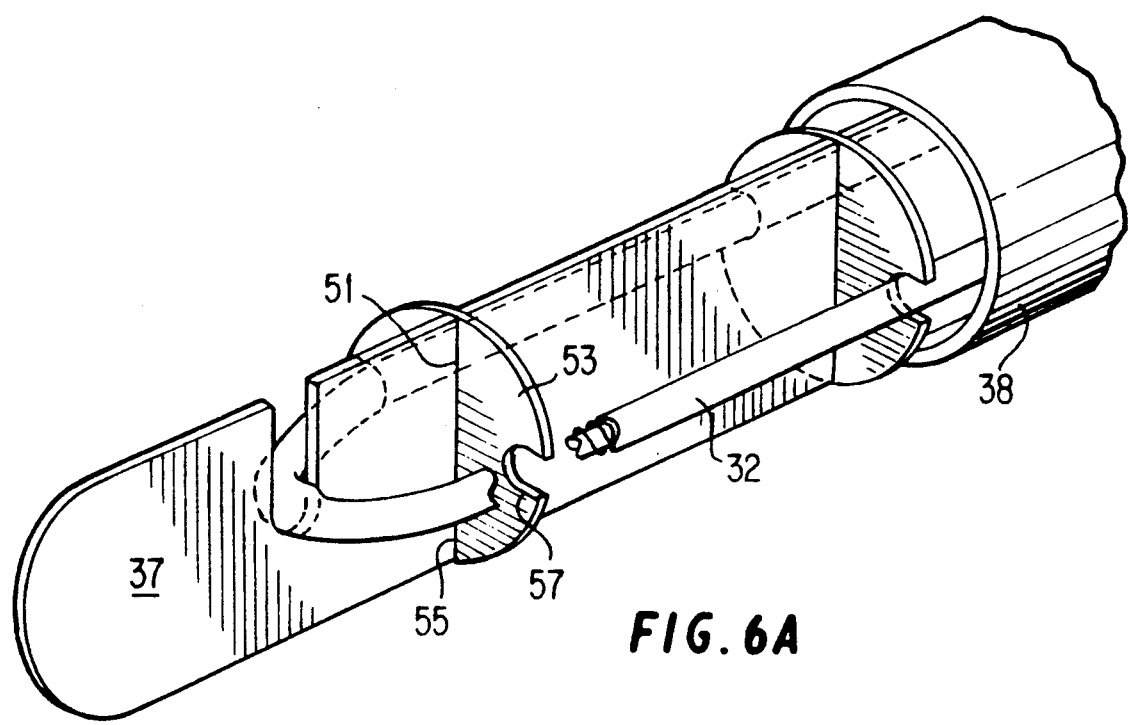
FIG. 6A is a perspective fragmentary illustration of an alternative embodiment of the heater support.

FIGS. 1-6 illustrate an embodiment of a hair styling appliance such as a curling iron 10 according to the present invention. The curling iron 10 comprises a handle portion 12 which houses a heater control 14, a temperature selector 16 and an ON/OFF switch 18 (shown in FIG. 7) which are coupled to the heater control 14.

The curling iron 10 has a heated hollow cylindrical curling barrel 20 supported by the handle portion 12 at its proximal end 22 by means of a connector tube 23. A so called cool tip 24 is secured to the open distal end 26 of the barrel 20. The purpose of the cool tip 24 is to allow a user to manipulate the heated curling iron 10 by handling the heat insulated handle 12 and the cool tip 24 so as to roll curls in the known manner. Some hair styling appliances not shown in detail but included within the invention, e.g. marcel curlers, and hot combs have a closed barrel end and do not employ a cool tip. A stand or rest 25 and a spring clip or flipper 26 are pivotably secured at spring clip pivots 27 secured to the barrel 20.

A heater element 30 is secured in the barrel 20. The heater element 30 (FIGS. 4-6) comprises a so-called rope heater 32 in the form of a selected length of nichrome wire 33 wrapped around a cylindrical fiber glass core 34 which may be either hollow or solid as desired. The wire wrapped core 34 may be disposed within a hollow cylindrical fiber glass outer sleeve 36 which provides electrical insulation and confines the wire 33. The rope heater 32 is formed into a U-shape and secured at one end into a slot 35 of mica support 37. One or more lengths of Kapton tape 39 and 41 secure free ends of the rope heater 32 to the support 37. A thermistor 40 exhibiting a positive temperature coefficient of resistance (PTC) is secured in a niche 42 in the mica support 37 and is held in place by a length of Kapton tape 43. A thermal fuse 45 is serially coupled to the rope heater 32 and is likewise secured to the mica support 37 by the length of Kapton tape 41 as shown.

Upon overheating the thermal fuse 45 opens the heater circuit.

The rope heater 32, the thermistor 40, the fuse 45 and support 37 are snugly located in a hollow cylindrical mica sleeve 38 (FIG. 2), which in turn is sleeved into the barrel 20 by an interference fit or other appropriate means as desired. When the rope heater 32 is energized, heat is efficiently transferred through the fiber glass sleeve 36 and mica sleeve 38 to the barrel 20. It has been found that heat transfer occurs through the mechanisms of conduction, convection and radiation.

The heater element 30 extends lengthwise of the barrel 20 as illustrated (FIG. 4). The distal end 48 of the rope heater 32 is spaced from the cool tip 26 to prevent overheating thereof so that it is maintained at a temperature which may be comfortably handled by the user.

Alternative embodiments of the heater 30 may be employed for different sizes and models of hair styling appliances. For example, the mica support may be suitably sized and shaped to fit such appliances. Also, as shown in FIG. 6A, mica support 37 may have radial slots 51 therein. Circular mica spacers 53 each having a diameter corresponding to the inner diameter of the mica sleeve 38 and also having a radial slot 55 may be located in mating relation with the corresponding slots 51 in mica support 37. Marginal recesses 57 receive the rope heater 32 therein to locate it adjacent to the inner wall of the mica sleeve 38 and proximate to the barrel 20 for better heat transfer to the barrel 20 when installed therein.

Figure 7:
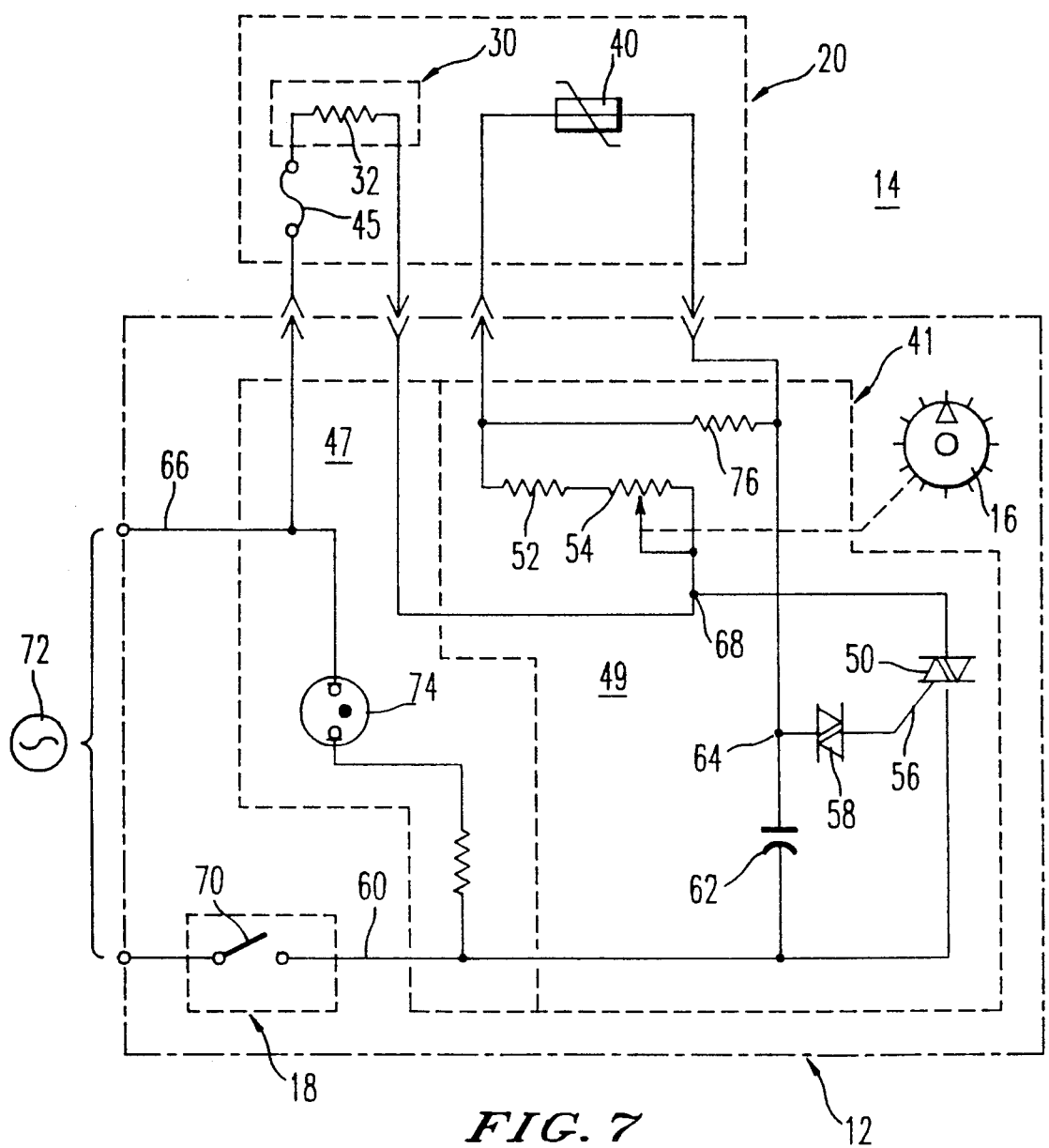
FIG. 7 is a schematic diagram of a heater control circuit in accordance with the present invention.

The heater control 14 includes circuit elements, hereinafter described, mounted on a PC board 41 located within the handle portion 12. In particular, as illustrated in FIG. 7, the control 14 includes a power circuit 47 for supplying power to the heater 32 and a control circuit 49 for periodically enabling energization of the rope heater 32 in accordance with the sensed temperature of the barrel 20.

The control circuit 49 includes a triac 50 serially coupled to the thermistor 40 through a current limiting resistor 52 and potentiometer 54 coupled to temperature selector. The triac 50 has a gate lead 56 coupled to a diac 58. The thermistor 40 is coupled to a common lead 60 via a serially connected capacitor 62. The diac 58 is coupled to a node 64 between the thermistor 40 and the capacitor 62. The power circuit 47 has a power input lead 66 serially coupled through the thermal fuse 45 to the heater 30 which in turn is coupled to a node 68 between the potentiometer 54 and the triac 50. The common lead 60 is coupled to a switch contact 70 in the ON/OFF switch 18. The power input lead 66 and the ON/OFF switch 18 are coupled across an AC input source 72. An indicator lamp 74 and high resistance load resistor 75 are coupled in series across the power input lead 66 and the common lead 60 as illustrated.

In operation, when the switch contact 70 is closed and the potentiometer 54 is set to a selected resistance value by rotation of the temperature selector 16, an input current is applied to the rope heater 32 (hereafter, heater 32) each time the triac 50 is gated on by the diac 58. The combined resistances of potentiometer 54, the current limiting resistor 52, and thermistor 40 establish with the capacitor 62 a pulse rate for triggering the triac 50 to on and off conditions through the diac 58. As the temperature of the heater 32 in heater element 30 increases, the barrel 20 becomes heated which in turn causes the thermistor 40 to become heated, thereby raising its resistance. The resistance change causes an increase in the firing angle or time for charging capacitor 62 which decreases the time that the triac 50 is gated on. The heater 32 is stabilized at the temperature which is established by the potentiometer 54 which in turn stabilizes the barrel 20 temperature.

As the temperature increases, the resistance of the thermistor 40 increases thereby reducing the power input to the heater 32. Likewise, the resistance of the potentiometer 54 may be adjusted upwardly for decreasing the power to the heater 32. As the temperature decreases, the resistance of the thermistor 40 decreases thereby stabilizing the power delivered to the heater 32 in a lower temperature range. The current limiting resistor 52 limits the current through potentiometer 54 when it is set to a minimum resistance. As the resistance of potentiometer 54 is decreased, capacitor 62 is more rapidly charged and discharged allowing the diac 58 to fire more rapidly thus turning on the triac 50 or decreasing the firing angle. A resistor 76, coupled in shunt with the thermistor 40, may be employed to establish a lower equivalent resistance of the thermistor 40 which results in less overshoot on initial heat up, decreasing the dependency of the thermistor 40 on the upper temperature range. In other words, the response of the thermistor 40 becomes more linear at the upper end of the temperature range.

Figure 8:
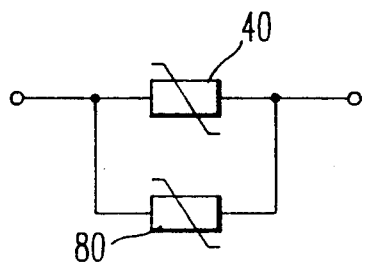
FIG. 8 illustrates an alternative embodiment of the control heater circuit of FIG. 7.

FIG. 8 illustrates an alternative embodiment to the invention in which the thermistor 40 is coupled in shunt with a negative temperature coefficient device (NTC) or thermistor 80 to reduce temperature overshoot. In this arrangement when the switch control 70 (FIG. 7) is closed, the thermistor 40 has a low resistance causing full power to be supplied to the heater 32. As the temperature increases the resistance of the thermistor 80 is reduced and the resistance of the thermistor 40 increases. The thermistors 40 and 80 both stabilize at the desired temperature. This combination of thermistors 40 and 80, having opposite temperature coefficients of resistance, in addition to reducing overshoots, may also be employed to provide fast recovery at the set point of the potentiometer 54.

Figure 9:
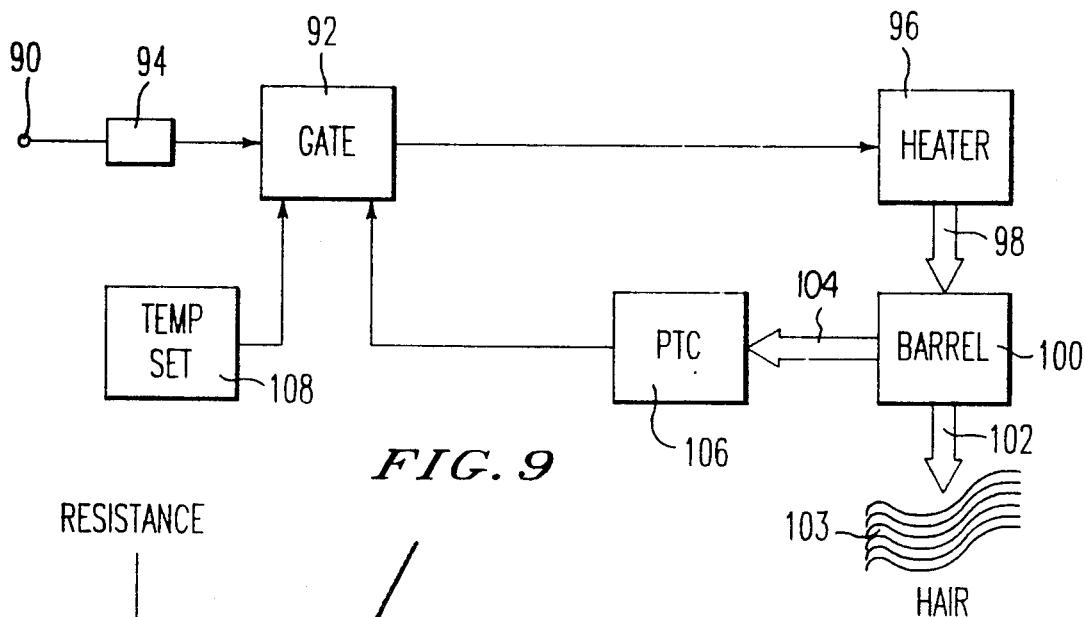
FIG. 9 is a schematic block diagram of the overall functional aspects of the heater control circuit of the present invention.

FIG. 9 illustrates the invention in schematic block form as a feedback loop containing a number of blocks. In the arrangement, power is provided at input 90 to gate 92 via ON/OFF switch 94. The gate 92 selectively gates power to the heater 96 which converts the input power to heat energy represented by the arrow 98. The heat energy 98 is transferred to the barrel 100 of the curling iron for delivering heat energy 102 to the hair 103 as illustrated. A portion of the heat energy 104 transferred to the barrel 100 is transferred to PTC device 106 which includes the thermistor 40 (FIG. 7) causing it to change resistance to thereby affect the gate 92. The temperature set 108 establishes the basic operating temperature for the gate 92 as modified by the change in resistance caused by heat energy 104 transferred to the PTC device 106.

Figure 10:
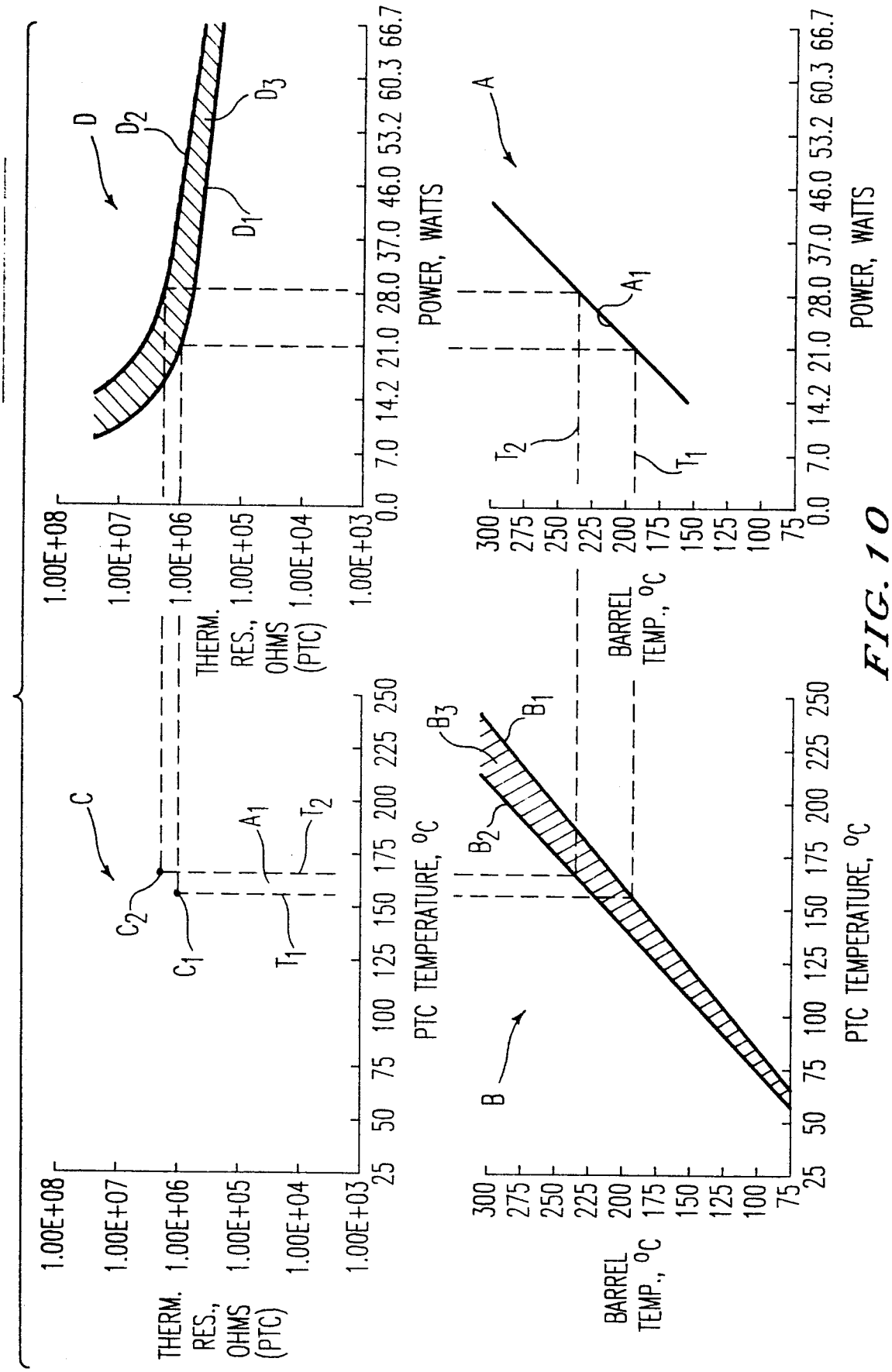
FIG. 10 is a combined plot of PTC resistance v. power consumption and barrel temperature with common points joined for comparison.

A graphical representation of the foregoing control loop is illustrated in the various interconnected plots A-D in FIG. 10. These plots illustrate the complex interdependencies of the various components in the control circuit 49 and the power circuit 47. Power applied to the heater 96 results in a change in the barrel temperature (Plot A). Likewise, a change in the barrel temperature results in a corresponding change in the thermistor temperature (Plot B). The barrel temperature is normally higher than the temperature of the thermistor (as shown). A change in the thermistor temperature results in a corresponding change in its resistance (Plot C). This is reflected as a change in the power to the heater (Plot D).

It has been found that differences in control stability can occur unless the interdependence of the components is considered. This interdependence occurs because the heater control 14 operates under extreme thermal and electrical conditions. Thus, although the heater control 14 appears to be fairly simple, it is in reality complex, because the power circuit 47 can cause the control circuit 49 to respond adversely. Accordingly, in order for the circuit to properly operate, tolerances of the components and especially the PTC device 106 must be carefully specified.

A number of factors affect the operation of conventional PTC devices such as thermistors including ambient temperature, internal shunt or stray capacitance and the applied voltage. A conventional thermistor has a positive coefficient of resistance PTC illustrated in FIG. 11 resulting in a device having a minimum resistance characteristic $R_{min}$ at low temperatures. The resistance rises steeply beyond the so called inflection point as temperature increases. For example, the $R_{min}$ or low resistance value which occurs at room temperature $T_r$ increases with temperature to the so-called inflection point temperature $T_I$ at which a resistance $R_s$ is equal to $2R_{min}$. Thereafter, the resistance of the thermistor increases rapidly with temperature.

Figure 11:
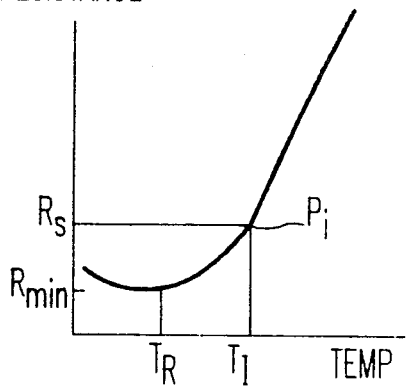
FIG. 11 is a characteristic of temperature v. resistance of a known PTC device.

The curve in FIG. 11 is operative at about room temperature (25° C.) and with a minimum applied voltage. When, however, high power is applied to a conventional thermistor device, consistent and predictable results are not always achieved.

Figure 12:
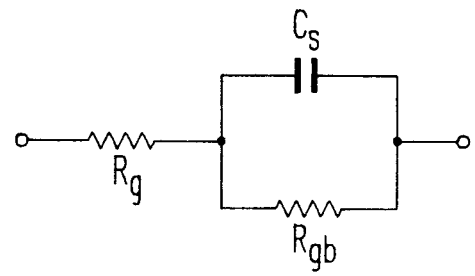
FIG. 12 is a schematic illustration of the equivalent circuit for a typical PTC device.
Figure 13:
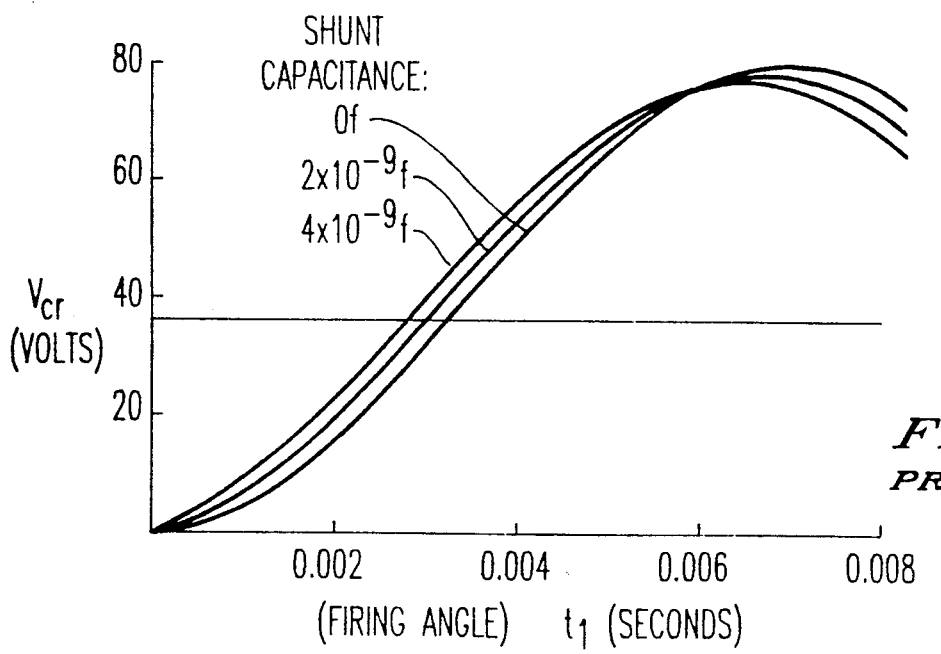
FIG. 13 is a plot of firing angle as a function of stray capacitance of a typical PTC device.

An equivalent circuit for a conventional thermistor is illustrated in FIG. 12. The positive temperature coefficient of resistance of the thermistor is a function of the grain resistance $R_g$ of individual elements plus the resistance of each grain boundary $R_{gb}$. The stray capacitance $C_s$ is the capacitance between the grains. Thus, as the applied voltage across the thermistor increases, the stray capacitance $C_s$ increases thereby reducing the firing angle. As illustrated in FIG. 13, the change in firing angle is about 0.0004 seconds between zero capacitance (0f) and $4 \times 10^{-9}$f.

In accordance with the invention, thermistor 40 characteristics are affected by a self heating and the applied voltage. Self heating is generally not extraordinarily significant at resistance values where control occurs in the present invention, because the power dissipated is less than 100 milliwatts. However, the voltage dependant resistance value of the thermistor 40 is significant in the present invention, because voltages in the order of 150 volts are applied across the PTC increasing stray capacitance $C_s$ and thereby decreasing or speeding up the firing angle of the device.

Referring again to FIG. 10, the plots A-D represent an example of the overall control system. Using the plots, the effect of tolerances in the various parts of the system can be determined. In particular, the tolerance of the thermistor 40 can be better specified in order to achieve acceptable results.

Plot A represents an exemplary barrel temperature operating range Al as a function of input power.

Curves B1 and B2 in plot B represent the variability of the relationship between the temperature of the barrel 20 and the temperature of the thermistor 40 in the range A1. Curve B1 represents the relationship (i.e. slope) at a lower tolerance level of the PTC characteristic of the thermistor 40. Curve B2 represents an upper tolerance level for the PTC characteristic. The shaded area B3 between the curves B1 and B2 is the tolerance range. The curves illustrate a linear relationship between the temperature of the thermistor 40 and the temperature of the barrel 20.

The resulting thermistor resistance at two exemplary temperatures $T_1$ and $T_2$ in the range A1 result in corresponding low and high extremes C1 and C2 in the thermistor resistance depicted in Plot C.

Curves D1 and D2 in plot D represent respectively the lower and higher power characteristic delivered to the barrel 20 as a function of thermistor resistance, i.e. the higher the resistance of the thermistor 40, the lower the power delivered to the barrel. The region D3 between the curves D1 and D2 represents range of variability in the relationship due to tolerances in the circuit components.

By employing a graphical technique, a range of tolerances can be found for the thermistor 40 which allows for predictable results. In the example, the thermistor resistance falls between C1 and C2 in the temperature range A1. Likewise, the power delivered to the barrel falls between 21 and 28 watts in this range for the tolerances graphically depicted.

Figure 14:
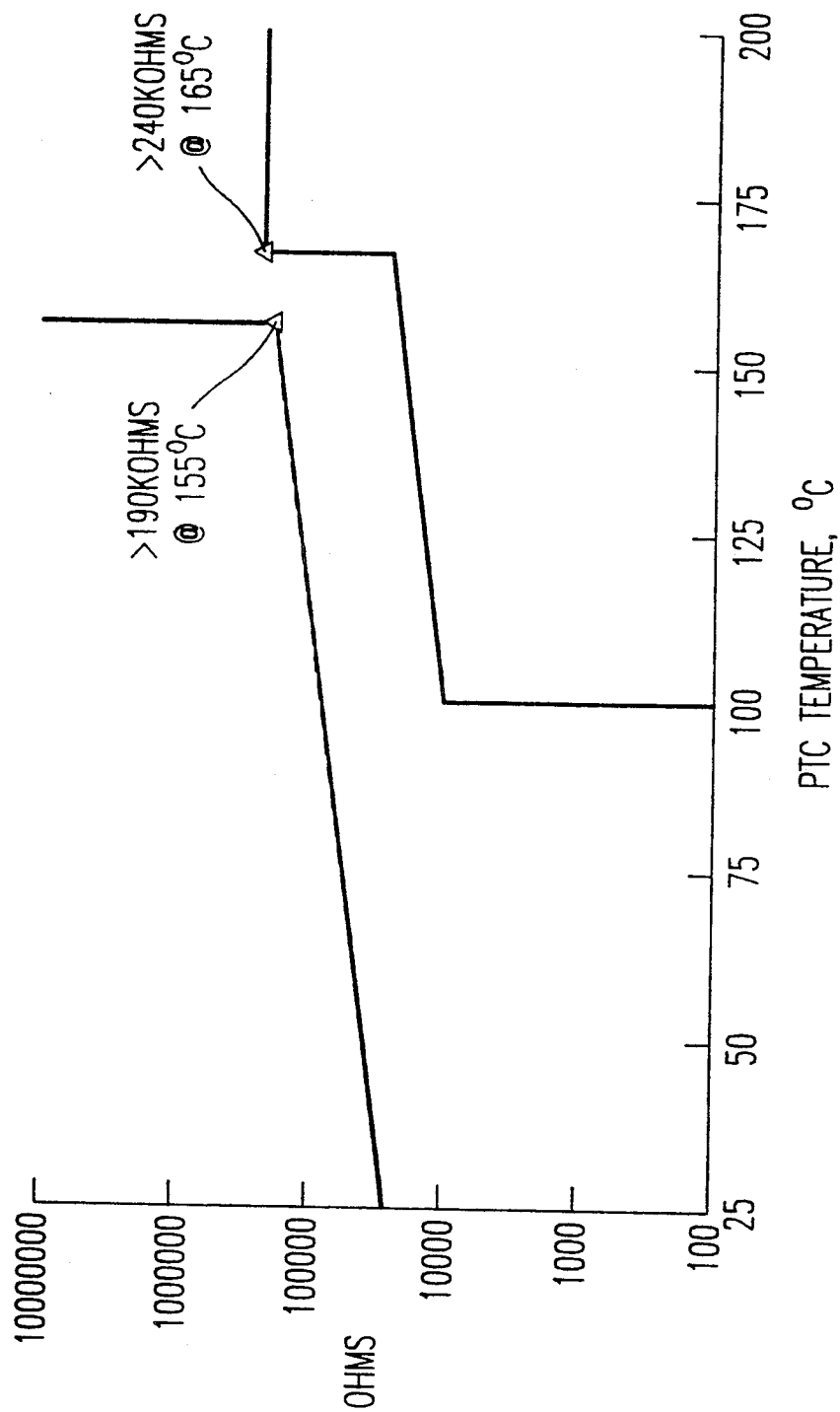
FIG. 14 is a plot of optimum resistance range v. temperature of a thermistor exhibiting a positive temperature coefficient of resistance (PTC) at selected specification points.

In order to achieve consistent and stable operation, the thermistor 40 has carefully specified operating limits over the temperature ranges contemplated. For example, as shown in FIG. 14, the thermistor 40 has a characteristic PTC so that it operates as a gradually varying resistance primarily between 100° and 200° C. At about 100° C., the resistance may vary between a minimum of about 100 ohms and about 90K ohms. At temperatures between 100° C. and 155° C. the resistance may vary between 10K ohms and 190K ohms with a maximum slope of 3.3K ohms/° C. Between 155° and 165° C., the resistance may vary between a minimum of about 25K ohms and above 240K as illustrated with a minimum slope of 5K ohms/° C. Above 165° C. the resistance of the thermistor 40 is greater than a minimum of 240K ohms. Any appropriate curve that fits the points noted may be constructed to provide for optimum operation. The result is a PTC characteristic which produces a controlled gradually increasing resistance change with increasing temperature of the thermistor 40 in the temperature range 100° C.-165° C.

Figure 15:
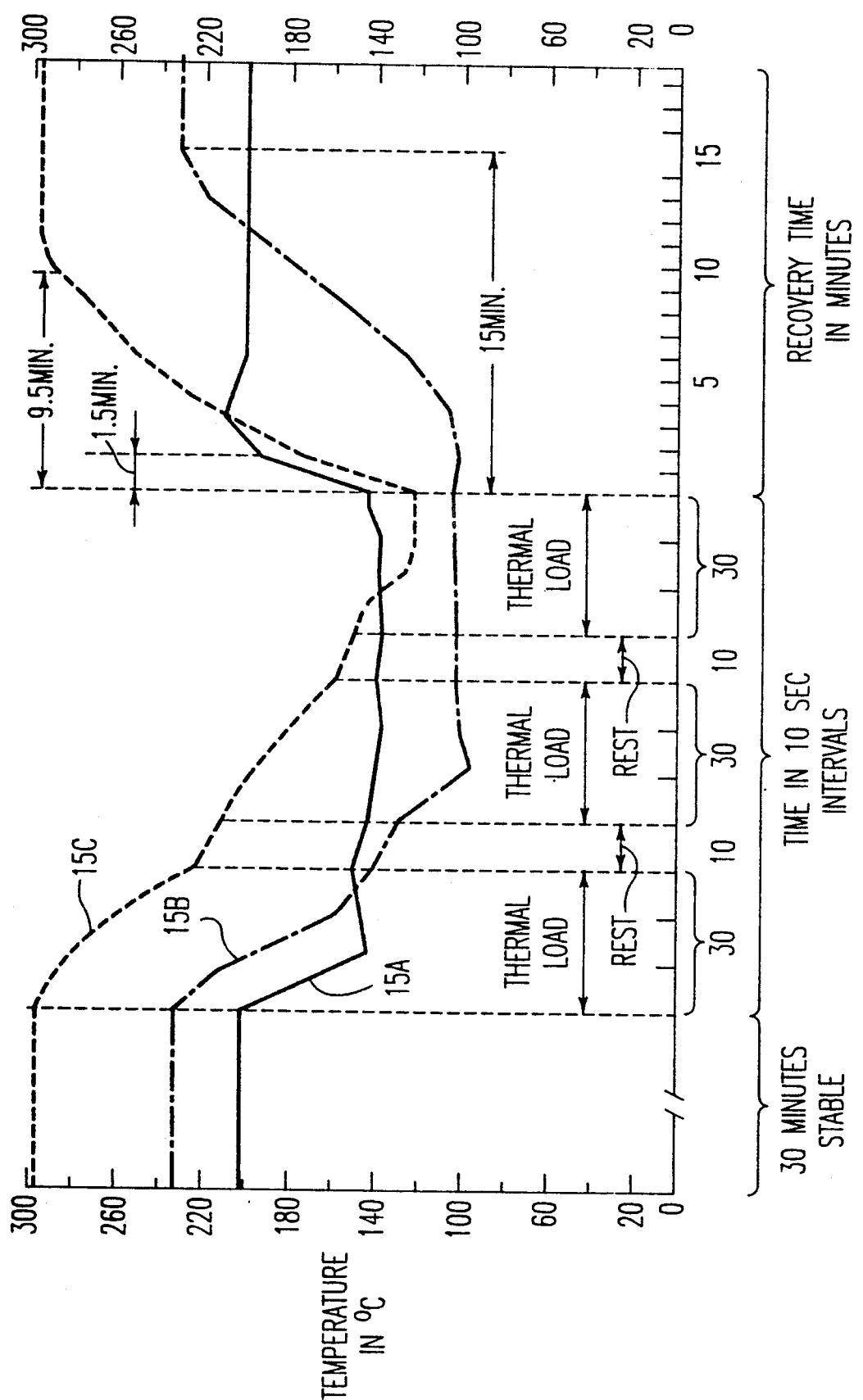
FIG. 15 is a plot of temperature v. time of the heater element of the present invention along with comparative plots for known temperature controls.

A plot of the temperature resulting from three consecutive thermal loads and recovery time to stable a temperature is illustrated in FIG. 15. Curve 15A represents the response of an embodiment of the present invention. Curves 15B and 15C represent other available hair curling irons. As can be readily appreciated from the illustration, the present invention represented by Curve 15A operates in a relatively narrow temperature range between fairly stable upper and lower limits (200° C.-140° C.). In terms of safety, the present invention operates at about 200° C. or lower which is significantly lower than other arrangements including one unit operating at near 300° C. Further, the lowest temperature experienced by the arrangement of the present invention is about 140° C. which is sufficient to safely and efficiently curl ethnic hair. Also, the temperature is relatively stable during each of three thermal load cycles depicted lasting 30 seconds with a 10 seconds rest interval. During three intervals of thermal loading, the present invention was stable at about 140° C. The other arrangements decreased rapidly from a high initial temperature 240° C. to a relatively flat low temperature 100° C. (Curve 15B) or decreased rapidly from 300° C. to 130° C. during thermal loading without much recovery in between loads in the rest intervals (Curve 15C).

Upon termination of thermal loading, the present invention recovered to about 200° C. in about 90 seconds. The arrangement illustrated by Curve 15B required close to 15 minutes to reach its initial operating temperature and about at least 10 minutes to reach 200° C. The arrangement illustrated by Curve 15C initially recovered fairly rapidly to about 200° C. in about 2.5 min. full, recovery to its initial operating temperature of 300° C., however, required 9.5 minutes overall. The known arrangements require high initial operating temperatures which are deemed to be undesirable. Because of their poor stability, they dissipate energy very quickly over three thermal cycles. The present invention on the other hand, operates within a safe temperature range and operates effectively even under severe thermal loads.

In the present invention, because the thermistor 40 is designed to operate over a wide temperature range and under the influence of large range of voltage inputs applied to it, the specified resistance characteristic of the thermistor 40 illustrated in FIG. 14 is important to the overall operation of the invention. The thermistor 40 acts as a regulator over the temperature range, rather than a switch. In normal thermistor operation the resistance change is relatively small, i.e. the resistance doubles between the minimum and the inflection point over a small temperature range with minimum input voltage. In the present invention the resistance experiences at least a ten (10) fold change over a large temperature range between 100° C. and 155° C. with a large input voltage. The carefully controlled positive temperature coefficient of resistance characteristic of the thermistor 40 achieved by the present invention allows for a degree of control which results in superior regulation of the appliance temperature as graphically illustrated in FIG. 15. In addition, over a narrow temperature range between 155° C. and 165° C., the optimum resistance of the thermistor 40 changes by about 50K ohms to thereby quickly reduce the power applied to the heater at the high temperature end of the range. Such a degree of regulation control has not been heretofore available in the art.

While there have been described what at present are considered to be preferred embodiments of the invention, it will be readily apparent to those skilled in the art that various changes and modifications may be made therein without departing from the invention. Accordingly, it is intended in the claims which follow to cover all such changes and modifications which fall within the true spirit and scope of the invention.

What is claimed is:

1. A hair styling appliance comprising:
    a heat conductive portion for applying heat to the hair;
    an electrically energizable heater element located in thermal relationship with the heat conductive portion for causing it to be heated upon application of energy;
    a temperature sensor located in thermal relationship with the heat conductive portion being connected to the heater element, the temperature sensor having a positive temperature coefficient of resistance characteristic resulting in a variable resistance which changes by no more than about 240k ohm in a temperature range between 100° C. and 165° C.; and pulse switching means operatively coupled to the heater and responsively coupled to the temperature sensor for controlling energization of the heater with temperature, said pulse switching means gating the heater on and off at a rate which decreases with increasing temperature in accordance with said variable resistance.

2. The appliance of claim 1 further including a shunt resistance coupled in parallel with the temperature sensor.

3. The appliance of claim 1 further including selectable temperature setting means coupled to the pulse switching means for limiting energization of the heater in accordance with a selected temperature of operation.

4. The appliance of claim 3 wherein the temperature setting means comprises a potentiometer and a current limiting means in series with the potentiometer for limiting current therethrough at a high temperature setting thereof.

5. The appliance of claim 1 wherein the heater element comprises an elongated tubular heater.

6. The appliance of claim 5 further comprising a planar support having a slot for receiving tubular heater therein.

7. The appliance of claim 6 further including an insulated tubular sleeve for receiving the tubular heater and the planar support axially therein and generally diametrically thereof.

8. The appliance of claim 7 wherein the heat conductive portion comprises a hollow cylindrical barrel and the tubular sleeve is axially securable within said barrel.

9. The appliance of claim 8 further including at least one circular insulating spacer having a radial slot formed therein and being located within the tubular sleeve in mating relation with a corresponding slot in the planar support and having marginal radial niches for receiving the tubular heater therein and for spacing said heater proximate to the tubular sleeve.

10. The appliance of claim 7 wherein the planar support and tubular sleeve are formed of mica.

11. The appliance of claim 7 wherein the planar support has a recess for receiving the temperature sensor therein.

12. The appliance of claim 5 wherein the tubular heater comprises a tubular support; a selected length of electrically heatable conductor helically wound on the support and an outer tubular covering secured about the conductor.

13. The appliance of claim 1 wherein the pulse switching means comprises switching means coupled in series with the heater element and a timing circuit responsively coupled to the temperature sensor and operatively coupled to the first switching means for periodically gating the first switching means for a selected interval related to the resistance of the temperature sensor.

14. The appliance of claim 13 wherein the switching means comprises a triac having an input and an output being serially coupled to the heater and a gate responsively coupled to the temperature sensor.

15. The appliance of claim 13 wherein the pulse switching means further includes capacitance means coupled to the temperature sensor for providing periodic outputs for gating the switch means in accordance with the resistance of the temperature sensor.

16. The appliance of claim 15 further including variable resistance means coupled to the capacitive means for varying a time interval for the periodic outputs.

17. The appliance of claim 1 wherein said temperature sensor comprises a first thermistor.

18. The appliance of claim 17 wherein said temperature sensor further includes a second thermistor having a negative temperature coefficient of resistance coupled in parallel with the first thermistor.

19. The appliance of claim 1 wherein the pulse switching means is responsive to the variable resistance of said temperature sensor to cause the temperature of the appliance to reach a maximum temperature of about 200° C. in about two minutes.

20. The appliance of claim 1 wherein the pulse switching means is responsive to the variable resistance of the temperature sensor to apply energy to the heater element in order to maintain the temperature of said conductive portion for a time interval comprising about three intervals each of 30 seconds while the conductive portion is in contact with the hair and two 10 second intervals while the conductive portion is out of contact with the hair.

21. A heater control for an appliance comprising:
an electrically energizable heater element located in thermal relationship with the appliance for causing it to be heated upon application of energy; and
a temperature sensor being connected to the heater element and located in thermal relationship with the appliance, said temperature sensor having a positive temperature coefficient of resistance characteristic in the form of a curve resulting in a variable resistance of said sensor which changes over a first temperature range by no more than 3.3K ohm/°C. and which changes over a second temperature range by not less than 5K ohms/°C. above the resistance in the first temperature range; and
pulse switching means operatively coupled for the heater element having a temperature dependent variable switching rate for periodically turning on and off the heater element and being responsively coupled to the temperature sensor for controlling electrical energization of the heater in accordance with the temperature dependent switching rate of said pulse switching means, said temperature sensor for selectively governing the rate at which said pulse switching means periodically turns on and off in the first temperature range for regulating the temperature of the heater element in accordance with the temperature of the appliance and for stabilizing the temperature of the heater element in the second temperature range.

22. A hair styling appliance operative within a styling temperature range up to a maximum temperature suitable for styling the hair without causing damage thereto by overheating and having relatively fast recovery within said styling range comprising:
a heat conductive portion for applying heat to the hair within said styling temperature range;
an electrically energizable heater element located in thermal relationship with the heat conductive portion for causing it to be heated upon application of energy;
a temperature sensor having a temperature dependent variable resistance located in thermal relationship with the heat conductive portion being connected to the heater element, said temperature sensor having a positive temperature coefficient of resistance characteristic such that the resistance thereof changes by no more than 240k ohm in the hair styling temperature range between about 100° C. and about 165° C.; and pulse switching means for gating energy and having a resistance dependent switching rate, said pulse switching means being operatively coupled to the heater and responsively coupled to the temperature sensor for selecting gating energization of the heater on and off at a rate dependent on the temperature of the sensor to cause said heat conductive portion to recover to said maximum temperature in about two minutes.

* * * * *